US008528389B2

(12) United States Patent
Sato et al.

(10) Patent No.: US 8,528,389 B2
(45) Date of Patent: Sep. 10, 2013

(54) ROTATION ANGLE SENSING ASSEMBLY INCLUDING ATTACHING STRUCTURE, VARIABLE VALVE MECHANISM FOR INTERNAL COMBUSTION ENGINE USING THE ATTACHING STRUCTURE, AND VEHICLE INCORPORATING THE SAME

(75) Inventors: Toshiyuki Sato, Saitama (JP); Masaki Cho, Saitama (JP); Takahiro Imafuku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 469 days.

(21) Appl. No.: 12/965,055

(22) Filed: Dec. 10, 2010

(65) Prior Publication Data

US 2011/0156728 A1 Jun. 30, 2011

(30) Foreign Application Priority Data

Dec. 25, 2009 (JP) ................................ 2009-295156

(51) Int. Cl.
*G01M 15/06* (2006.01)

(52) U.S. Cl.
USPC ....................................................... 73/114.26

(58) Field of Classification Search
USPC ....................................................... 73/114.26
See application file for complete search history.

(56) References Cited

U.S. PATENT DOCUMENTS

| | | | | |
|---|---|---|---|---|
| 4,932,388 | A * | 6/1990 | Chiba et al. | 123/613 |
| 5,948,973 | A * | 9/1999 | Fujii et al. | 73/114.26 |
| 6,481,272 | B1 * | 11/2002 | Kieselbach | 73/117.02 |
| 7,191,641 | B2 * | 3/2007 | Mayol et al. | 73/114.26 |
| 7,323,866 | B1 * | 1/2008 | Uryu et al. | 324/207.25 |
| 7,454,961 | B2 * | 11/2008 | Pirone | 73/114.26 |
| 7,469,575 | B2 * | 12/2008 | Kremer et al. | 73/114.26 |
| 8,225,760 | B2 * | 7/2012 | Sato et al. | 123/90.16 |
| 8,360,018 | B2 * | 1/2013 | Sato et al. | 123/90.16 |
| 8,375,905 | B2 * | 2/2013 | Sato et al. | 123/90.16 |
| 2007/0163336 | A1 * | 7/2007 | Pirone | 73/117.3 |
| 2010/0242871 | A1 * | 9/2010 | Sato et al. | 123/54.4 |
| 2010/0242882 | A1 * | 9/2010 | Sato et al. | 123/90.17 |

FOREIGN PATENT DOCUMENTS

JP 05-202719 A 8/1993

* cited by examiner

*Primary Examiner* — Freddie Kirkland, III
(74) *Attorney, Agent, or Firm* — Carrier Blackman & Associates, P.C.; Joseph P. Carrier; William D. Blackman

(57) ABSTRACT

In a rotation angle sensor attaching structure for detecting rotation of a rotational angle detection object shaft through a reduction gear, an outer race of a bearing is force fitted in and secured to a central portion of the reduction gear, and an inner race of the bearing is secured to a supporting wall by a supporting bolt. A sensor-connecting element of a rotation angle sensor, which extends across a head portion of the supporting bolt, is secured integrally to an outer side face of the reduction gear. Such arrangement achieves a minimal size of the rotation angle sensor attaching structure.

20 Claims, 11 Drawing Sheets

ROTATION ANGLE SENSING ASSEMBLY INCLUDING ATTACHING STRUCTURE, VARIABLE VALVE MECHANISM FOR INTERNAL COMBUSTION ENGINE USING THE ATTACHING STRUCTURE, AND VEHICLE INCORPORATING THE SAME

CROSS-REFERENCE TO RELATED APPLICATIONS

The present invention claims priority under 35 USC 119 based on Japanese patent application No. 2009-295156, filed on Dec. 25, 2009. The entire subject matter of this priority document, including specification claims and drawings thereof, is incorporated by reference herein.

BACKGROUND OF THE INVENTION

1. Field of the Invention

The present invention relates to a rotation angle sensing assembly including sensor attaching structure, to a variable valve mechanism for an internal combustion engine having such attachment structure, and to a vehicle incorporating the same. More particularly, the present invention relates to an attachment structure in which an outer race of a bearing is secured with a reduction gear and an inner race of the bearing is secured to a supporting wall provided on a cylinder head, and a rotation angle sensor is secured integrally to the reduction gear, and to a vehicle incorporating the same.

2. Description of the Background Art

There is a known rotation angle sensor attaching structure provided on a variable valve mechanism for an internal combustion engine, a rotation angle detection object shaft is supported at two places at the opposite ends thereof by bearings, and a rotation angle sensor for detecting the rotation angle of the shaft is connected to an end portion of the rotation angle detection object shaft. An example of such rotation angle sensor attaching structure is disclosed in the Japanese Patent Laid-Open No. Hei 5-202719.

In such a known rotation angle sensor attaching structure, as described above, where a configuration wherein the rotation angle detection object shaft rotates a plural number of times uses a rotation angle sensor having a detection range of one rotation) (360°), a reduction gear, for reducing the speed of rotation of the rotation angle detection object shaft, is required. As a configuration for providing such reduction gear, it seems appropriate to support the opposite ends of the reduction gear in its axial direction by means of bearings or the like. In this instance, however, in order to support the reduction gear, it is necessary to assure a space in the axial direction of the rotation angle detection object shaft.

The present invention has been made in view of such circumstances as described above. Accordingly, it is one of the objects of the present invention to make it possible to miniaturize a rotation angle sensor attaching structure.

SUMMARY OF THE INVENTION

In order to achieve the above objects, the present invention provides a rotation angle sensor attaching structure for detecting rotation of a rotation angle detection object shaft through a reduction gear, is characterized in that an outer race of a bearing is force-fitted in and secured to a central portion of the reduction gear and an inner race of the bearing is secured to a supporting wall by a bolt, and an attaching supporting portion of the rotation angle sensor which extends across a head portion of the bolt is secured integrally to a side face of the reduction gear.

With this structure, since the outer race of the bearing is force fitted in the reduction gear and the inner race is secured to the supporting wall by the bolt and besides the attaching supporting portion of the rotation angle sensor is integrally secured to the side face of the reduction gear, only one bearing is required for attaching the reduction gear.

Consequently, since a large space is not required to attach the reduction gear, the rotation angle sensor attaching structure can be miniaturized in the axial direction of the rotation angle detection object shaft. Further, since only one bearing is required, the number of parts can be reduced. Furthermore, since the attaching supporting portion of the rotation angle sensor is secured integrally to the side face of the reduction gear, the rotation angle sensor attaching mechanism can be miniaturized in the axial direction.

In the configuration described above, the rotation angle sensor may be a potentiometer. Accordingly, the rotation angle of the rotation angle detection object shaft can be detected using the potentiometer, which is less expensive than the known methods.

Further, the present invention provides a variable valve mechanism for an internal combustion engine, characterized in that the rotation angle sensor attaching structure described above is used, and that a rotary shaft provided in parallel to an actuator provided on a side face of a cylinder head is driven by the actuator to vary the phase and/or the lift amount of the valve and the rotary shaft is used as the rotation angle detection object shaft while a driving gear of the reduction gear is provided at an end portion of the rotary shaft and the rotation angle sensor is provided on a side face of the cylinder head which extends perpendicularly to the rotary shaft.

With this structure, since the actuator is provided on the side face of the cylinder head in parallel to the rotary shaft and the rotation angle sensor is provided on the cylinder head side face perpendicular to the rotary shaft, the actuator and the rotation angle sensor do not make an obstacle to the disposition of other parts and can be disposed compactly.

Further, in the configuration described above, the internal combustion engine may be a V-type internal combustion engine having cylinders disposed in a V shape, and the actuator may be disposed on the counter offset side of the front and rear cylinders. Accordingly, since the actuator is disposed on the counter offset side of the cylinders, the actuator can be disposed compactly and the horizontal width of the internal combustion engine can be suppressed small.

Furthermore, the rotation angle sensor may be disposed on the inner side of the V banks Accordingly, since the rotation angle sensor is disposed on the inner side of the V banks, the rotation angle sensor can be disposed compactly such that it may not make an obstacle to the disposition of other parts.

Further, the internal combustion engine may be an internal combustion engine of a motorcycle wherein the V banks are disposed in the forward and rearward direction of a vehicle body. Accordingly, since the rotation angle sensor is disposed on the inner side of the V banks disposed in the forward and rearward direction of the motorcycle, the rotation angle sensor can be prevented from being hit by a flying stone or the like.

EFFECTS OF THE INVENTION

With the rotation angle sensor attaching structure according to the present invention, since the outer race of the bearing is force fitted in the reduction gear and the inner race is secured to the supporting wall by the bolt and besides the attaching supporting portion of the rotation angle sensor is integrally secured to the side face of the reduction gear, only one bearing is required for attaching the reduction gear.

Accordingly, since a large space is not required to attach the reduction gear, the rotation angle sensor attaching structure can be miniaturized in the axial direction of the rotation angle detection object shaft. Further, since only one bearing is required, the number of parts can be reduced. Furthermore, since the attaching supporting portion of the rotation angle sensor is secured integrally to the side face of the reduction gear, the rotation angle sensor attaching mechanism can be miniaturized in the axial direction.

Further, the rotation angle of the rotation angle detection object shaft can be detected using the potentiometer which is less expensive.

Meanwhile, with the variable valve mechanism for an internal combustion engine which uses the rotation angle sensor attaching structure according to the present invention, since the actuator is provided on the side face of the cylinder head in parallel to the rotary shaft and the rotation angle sensor is provided on the cylinder head side face perpendicular to the rotary shaft, the actuator and the rotation angle sensor do not make an obstacle to the disposition of other parts and can be disposed compactly.

Further, since the actuator is disposed on the counter offset side of the cylinders, the actuator can be disposed compactly and the horizontal width of the internal combustion engine can be suppressed small.

Furthermore, since the rotation angle sensor is disposed on the inner side of the V banks, the rotation angle sensor can be disposed compactly such that it may not make an obstacle to the disposition of other parts.

Further, since the rotation angle sensor is disposed on the inner side of the V banks disposed in the forward and rearward direction of the motorcycle, the rotation angle sensor can be prevented from being hit by a flying stone or the like.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like “upper”, “lower”, “above”, “below”, “front”, “back”, and the like are used in reference to a vantage point of an operator of the vehicle, seated on the driver’s seat and facing forward. It should be understood that these terms are used for purposes of illustration, and are not intended to limit the invention.

Figure 1:
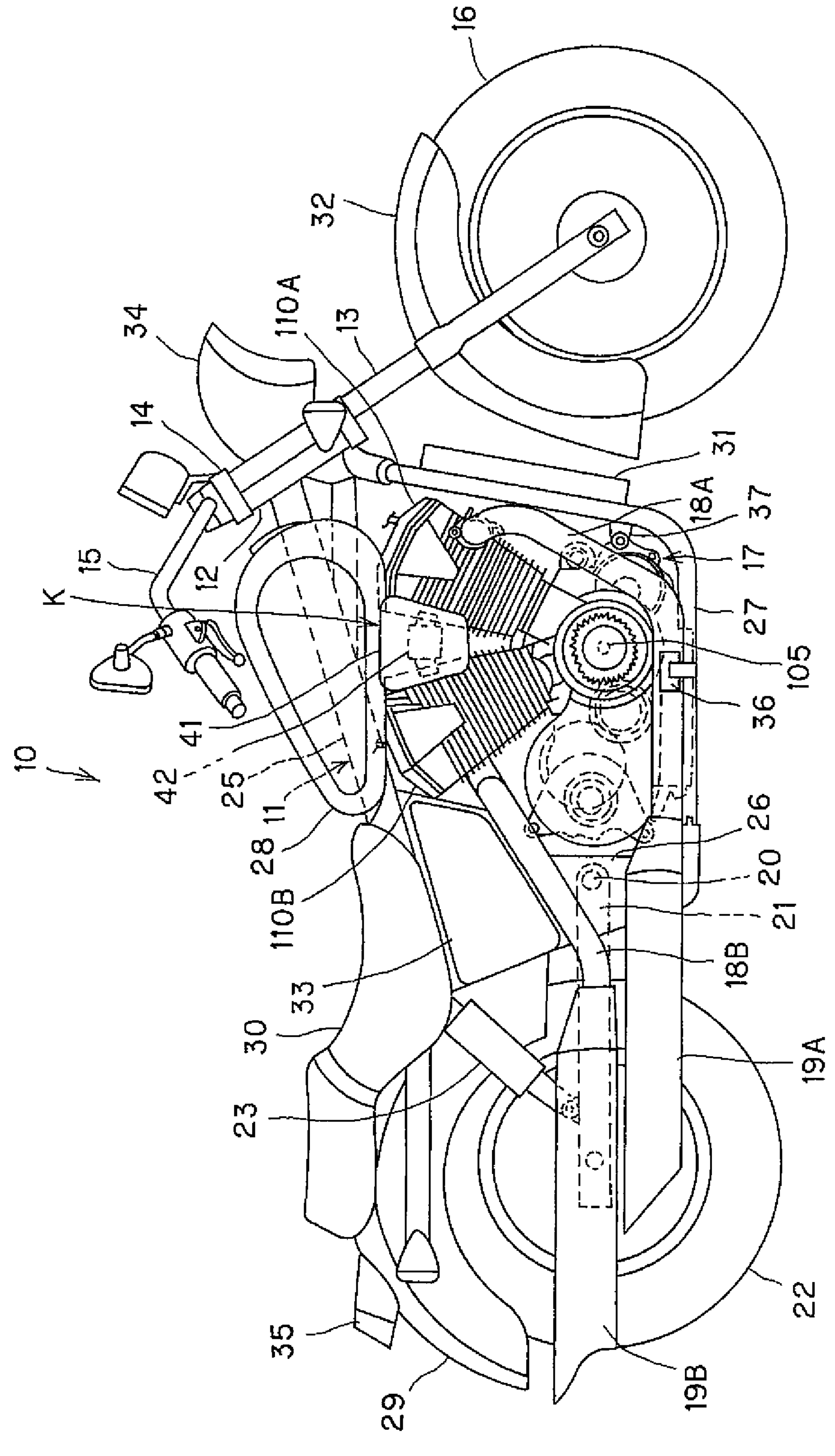
FIG. 1 is a right side elevational view of a motorcycle to which a movable valve mechanism for an internal combustion engine according to an embodiment of the present invention is applied.

FIG. 1 is a right side elevational view of a motorcycle 10 including a rotation angle sensor attaching structure according to an illustrative embodiment of the present invention. The motorcycle 10 includes a vehicle body frame 11, a pair of left and right front forks 13 supported for turning motion on a head pipe 12 attached to a front end portion of the vehicle body frame 11, a handle bar 15 for steering attached to a top bridge 14 which supports upper end portions of the front forks 13, and a front wheel 16 supported for rotation on the front forks 13.

The motorcycle 10 also includes an engine 17 as an internal combustion engine supported on the vehicle body frame 11, exhaust mufflers 19A and 19B connected to the engine 17 through exhaust pipes 18A and 18B, a rear swing arm 21 supported for upward and downward rocking motion on a pivot 20 at a rear lower portion of the vehicle body frame 11, and a rear wheel 22 supported for rotation at a rear end portion of the rear swing arm 21. A rear shock absorber 23 is disposed between the rear swing arm 21 and the vehicle body frame 11.

The vehicle body frame 11 includes a main frame 25 extending rearwardly downwards from the head pipe 12, a pair of left and right pivot plates (also called center frames) 26 connected to a rear portion of the main frame 25, and a down tube 27 extend downwardly from the head pipe 12 and then extending in a curved state until it is connected to the pivot plates 26. A fuel tank 28 is supported in such a manner as to cross over the main frame 25, and the main frame 25 extends rearwardly to a location above the rear wheel 22, at which a rear fender 29 is supported. A seat 30 is supported between an upper portion of the rear fender 29 and the fuel tank 28. As shown in FIG. 1, the motorcycle 10 also includes a radiator 31 supported on the down tube 27, a front fender 32, a side cover 33, a headlamp 34, a tail lamp 35, and a rider’s step 36.

The engine 17 is supported in a space surrounded by the main frame 25, pivot plates 26 and down tube 27. The engine 17 is a V-type internal combustion engine. The engine 17 has is a front and rear V-type two-cylinder water-cooled four-cycle engine having cylinders banked on the front and the rear in a V-shape. The engine 17 is supported on the vehicle body frame 11 through a plurality of engine brackets 37 (only one is shown in FIG. 1) such that a crankshaft 105 is directed in a horizontal vehicle width direction oriented transversely with respect to a longitudinal axis of the vehicle body. Power of the engine 17 is transmitted to the rear wheel 22 through a drive shaft (not shown) disposed on the left side of the rear wheel 22.

The engine 17 is formed such that the included angle (also called bank angle) between a front bank 110A (cylinder) and a rear bank 110B (cylinder) which individually configure the cylinders is smaller than 90 degrees (for example, 52 degrees). Valve mechanisms of the banks 110A and 110B are configured as those of a 4-valve double overhead camshaft (DOHC) type.

An air cleaner housing 41 and a throttle body 42 which configure an engine intake system are disposed in a V bank space K (FIG. 2) formed in the forward and rearward direction of the vehicle body between the front bank 110A and the rear bank 110B and having a V shape, as viewed in side elevation. The throttle body 42 supplies air cleaned by the air cleaner housing 41 to the front bank 110A and the rear bank 110B. Further, the exhaust pipes 18A and 18B which configure an engine exhaust system are connected to the banks 110A and 110B, and extend along the right side of the vehicle body such that the exhaust mufflers 19A and 19B are connected to rear ends of the exhaust pipes 18A and 18B, respectively. Consequently, exhaust gas is exhausted through the exhaust pipes 18A and 18B and the exhaust mufflers 19A and 19B.

Figure 2:
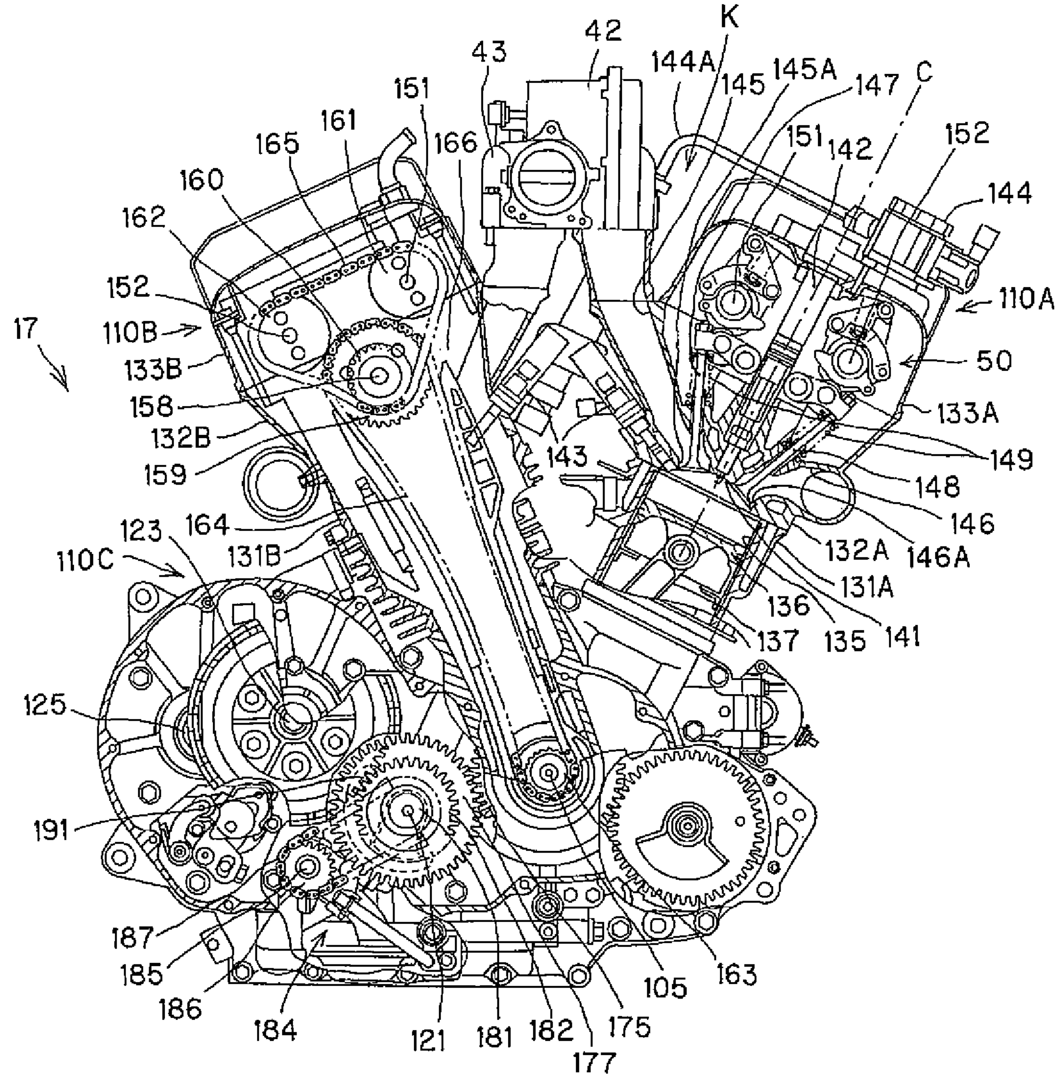
FIG. 2 is a cut-away side view of an internal structure of an engine as viewed from the right side.
Figure 3:
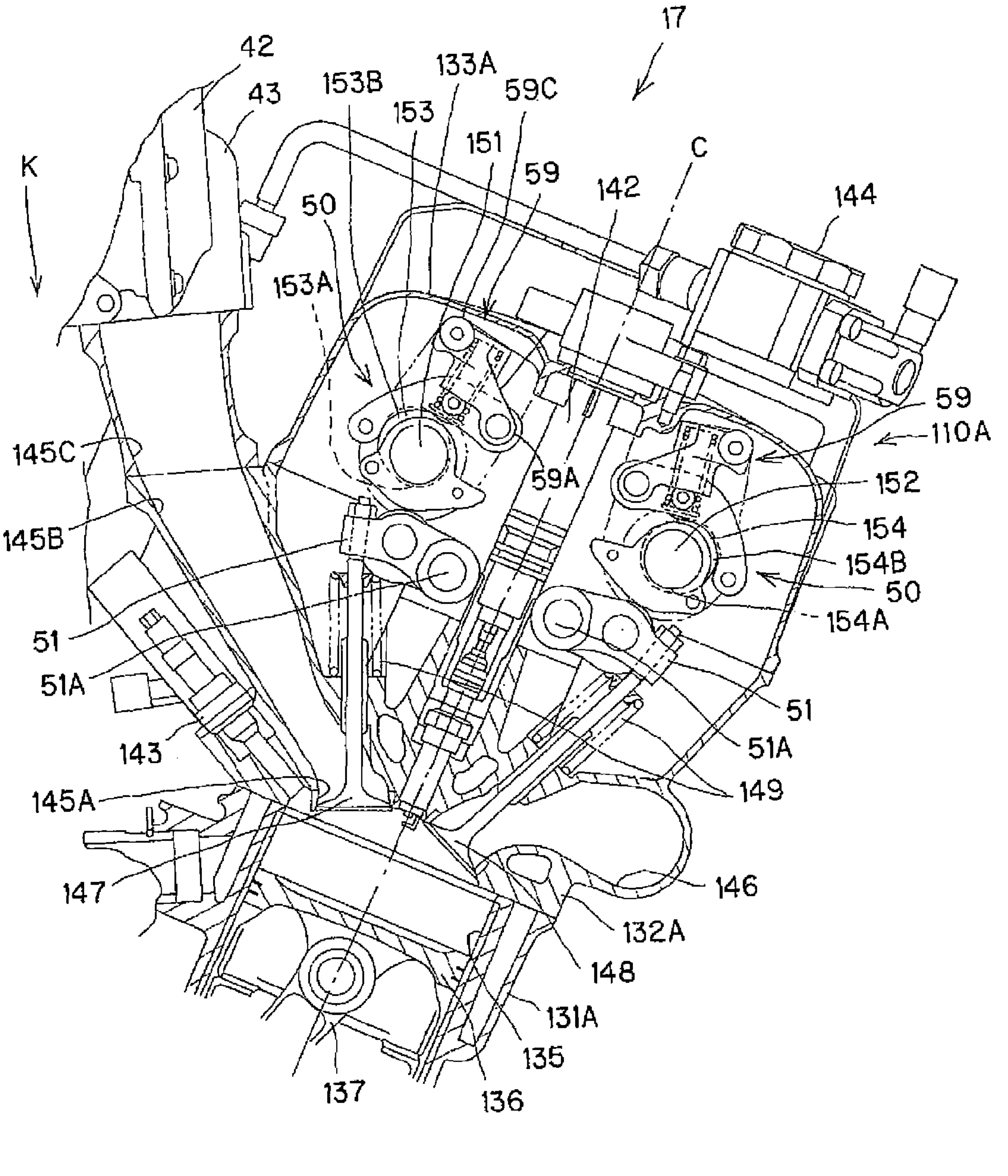
FIG. 3 is a detail sectional view showing an internal structure of a front bank of FIG. 2 in an enlarged scale.

FIG. 2 is a cut-away view of an internal structure of the engine 17 as viewed from the right side, and FIG. 3 is a detail sectional view showing an internal structure of the front bank 110A of FIG. 2 in an enlarged scale.

Referring to FIG. 2, the front bank 110A and the rear bank 110B of the engine 17 each have a substantially similar structure. In FIG. 2, the front bank 110A is shown in regard to peripheral members to a piston, and the rear bank 110B is shown with regard to peripheral members to a cam chain. As shown in FIG. 2, the engine includes an intermediate shaft (rear side balancer) 121, a main shaft 123, and a countershaft 125. These shafts 121, 123 and 125 and the crankshaft 105 are all disposed parallel to each other, while they are displaced in the vehicle body forward and rearward direction and upward and downward directions. In addition, a gear transmission mechanism for transmitting rotation of the crankshaft 105 to the intermediate shaft 121, the main shaft 123 and the countershaft 125 in order is configured in a crankcase 110C which supports the shafts 121, 123 and 125.

As shown in FIG. 2, a front side cylinder block 131A and a rear side cylinder block 131B are disposed on an upper face of the crankcase 110C of the engine 17 extending forwardly and rearwardly on the vehicle body, and oriented in such a manner as to define a predetermined included angle therebetween. A front side cylinder head 132A and a rear side cylinder head 132B are coupled to an upper face of the cylinder blocks 131A and 131B, respectively. Further, head covers 133A and 133B are mounted on an upper face of the cylinder heads 132A and 132B to configure the front bank 110A and the rear bank 110B, respectively, of the engine 17.

A cylinder bore 135 is formed in each of the cylinder blocks 131A and 131B, and a piston 136 is inserted for sliding movement in each of the cylinder bores 135. The pistons 136 are connected to the crankshaft 105 through connecting rods 137.

A combustion recess 141 which configures the top face of a combustion chamber is disposed above the piston 136, and is formed on a lower face of each of the cylinder heads 132A and 132B, and a spark plug 142 is disposed in each of the combustion recesses 141, with an end thereof exposed to the combustion recess 141. The spark plug 142 is provided substantially coaxially with a cylinder axial line C.

The engine 17 is a fuel-injection type engine, wherein fuel is injected directly into the combustion chamber from an associated injector 143 provided for each cylinder, with a respective tip end thereof extending into each of the combustion recesses 141. The injectors 143 are inserted from V-bank inner side faces of the cylinder heads 132A and 132B, and disposed such that the tip ends thereof are exposed to the combustion recesses 141. Each injector 143 is attached in a state wherein it is inclined with respect to the cylinder axial line C.

A fuel pump 144 is provided at an upper portion of the head cover 133A. Fuel is supplied from the fuel pump 144 to the injectors 143 through a fuel pipe 144A.

The cylinder heads 132A and 132B have intake ports 145 formed therein, which are communicated with the combustion recesses 141 by a pair of openings 145A formed in the cylinder head, and exhaust ports 146 which are communicated with the combustion recesses 141 by a pair of openings 146A formed in the cylinder head. The intake ports 145 are disposed between the cylinder axial line C and the injectors 143.

As shown in FIGS. 2 and 3, each of the intake ports 145 includes a lower intake port 145B provided integrally with the cylinder head 132A or 132B, and an upper intake port 145C provided separately from the cylinder head 132A or 132B. The upper intake ports 145C are attached to the lower intake ports 145B at angles varied toward a direction in which they further approach the head covers 133A and 133B.

The intake ports 145 merge with each other at an intake chamber 43, and the intake chamber 43 is connected to the throttle body 42. For the throttle body 42, a Throttle-By-Wire (TBW) system is adopted, which varies the sectional area of the throttle valve by electronic driving of an actuator. The exhaust port 146 of the cylinder head 132A is operatively connected to an exhaust pipe 18A, and the exhaust port 146 of the cylinder head 132B is operatively connected to another exhaust pipe 18B (FIG. 1).

Figure 4:
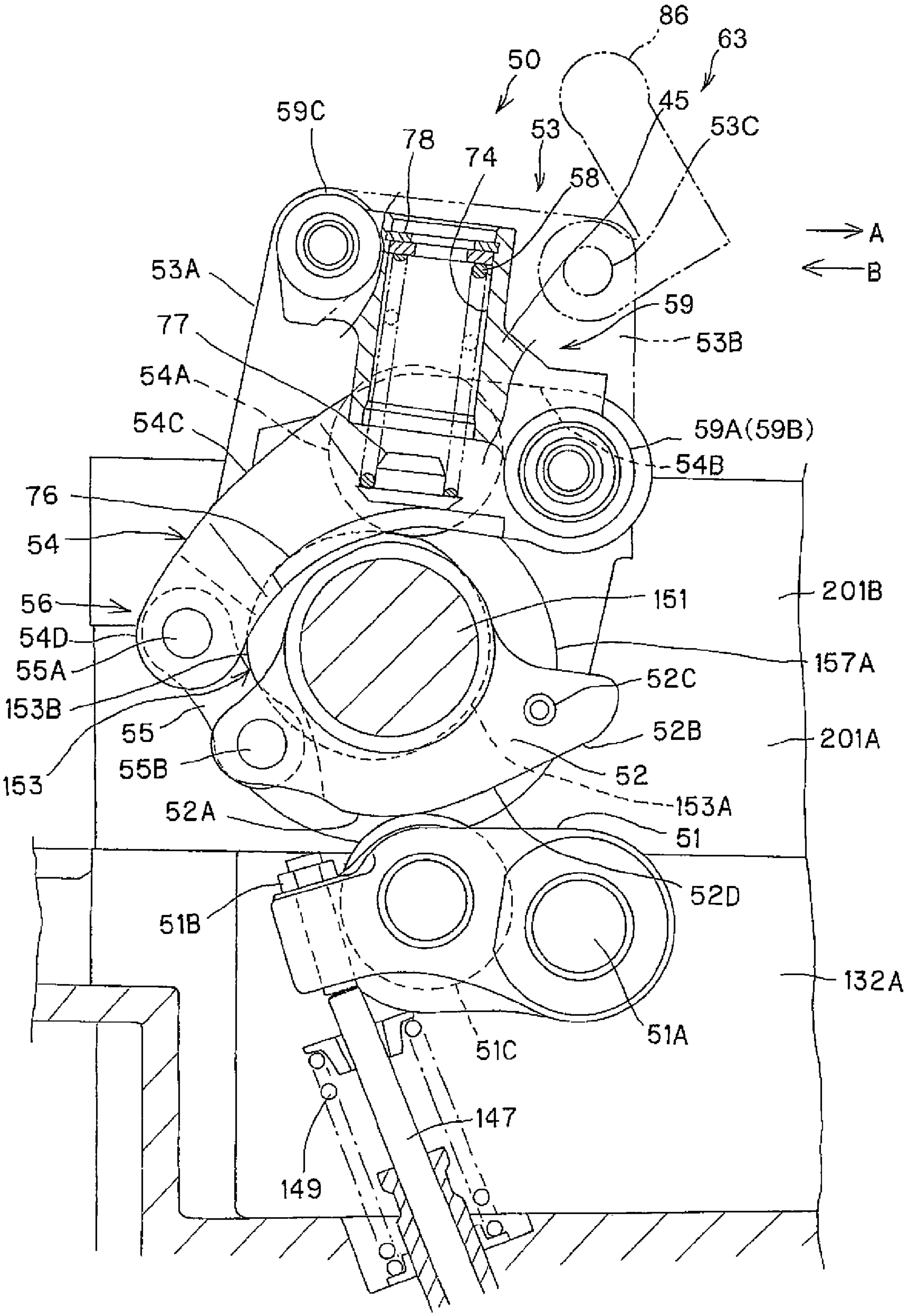
FIG. 4 is a side elevational view partly in section showing a valve mechanism.

A pair of intake valves 147 (valves) are disposed in the cylinder heads 132A and 132B for operating, i.e., opening and closing the openings 145A of the intake ports 145. Similarly, a pair of exhaust valves 148 (valves) are disposed in the cylinder heads 132A and 132B for opening and closing the openings 146A of the exhaust ports 146. The intake valves 147 and the exhaust valves 148 are individually biased in a closing direction of the ports by respective valve springs 149, 149. The valves 147 and 148 are driven by valve trains 50 (variable valve trains), which can vary valve operation characteristics such as the opening and closing timings, the lift amounts and so forth of the engine valves. The valve trains 50 include camshafts 151 and 152 on the intake side and the exhaust side which are supported for rotation on the cylinder heads 132A and 132B and rotate in an interlocking relationship with rotation of the crankshafts 105. Here, the camshafts 151 and 152 rotate in counterclockwise direction (FIGS. 2 and 4).

An intake cam 153 is formed integrally on each camshaft 151. The intake cam 153 has a base portion 153A which forms a circular cam face, and a cam lobe portion 153B which forms a cam face which projects to the outer periphery side from the base portion 153A. Further, an exhaust cam 154 is formed integrally on each camshaft 152. The exhaust cam 154 has a base portion 154A having a circular cam face, and a cam lobe portion 154B projecting to the outer periphery side from the base portion 154A and forming a mountain-shaped cam face.

As shown in FIG. 2, an intermediate shaft 158 is supported for rotation on one end side of each of the cylinder heads 132A and 132B in the widthwise direction, and intermediate sprockets 159 and 160 are secured to the intermediate shaft 158. A driven sprocket 161 is secured to one end side of the camshaft 151, and another driven sprocket 162 is connected to one end side of the camshaft 152. Driving sprockets 163 are secured to the opposite end sides of the crankshaft 105. A first cam chain 164 is wrapped between the sprockets 159 and 163, and a second cam chain 165 is wrapped between the sprockets 160 to 162. The sprockets 159 and 163 and the cam chains 164 and 165 are accommodated in a cam chain chamber 166 formed on one end side of each of the banks 110A and 110B.

The reduction gear ratio from the driving sprocket 163 to the driven sprockets 161 and 162 is set to 2, and if the crankshaft 105 rotates, then the driving sprocket 163 rotates integrally with the crankshaft 105 and the driven sprockets 161 and 162 rotate at a rotational speed equal to one half that of the crankshaft 105 through the cam chains 164 and 165. Consequently, the valves 147 and 148 open and close the intake port 145 and the exhaust port 146 in accordance with the cam profile of the camshafts 151 and 152 which rotate integrally with the driven sprockets 161 and 162.

A generator (not shown) is provided at a left end portion of the crankshaft 105, and a driving gear wheel (hereinafter referred to as crank side driving gear wheel) 175 is secured to a right end portion of the crankshaft 105 on the inner side of the right side driving sprocket 163 (on the left side of the vehicle body). The crank side driving gear wheel 175 meshes with a driven gear wheel (hereinafter referred to as intermediate side driven gear wheel) 177 provided on the intermediate shaft 121 and transmits rotation of the crankshaft 105 at an equal speed to the intermediate shaft 121 to rotate the intermediate shaft 121 at the equal speed and in the opposite direction to that of the crankshaft 105.

The intermediate shaft 121 is supported for rotation below the rear side of the crankshaft 105 and below the front side of the main shaft 123.

At a right end portion of the intermediate shaft 121, an oil pump driving sprocket 181, the intermediate side driven gear wheel 177 and a driving gear wheel (hereinafter referred to as intermediate side driving gear wheel) 182 of a diameter smaller than that of the driven gear wheel 177 are attached in order.

The oil pump driving sprocket 181 transmits rotating force of the intermediate shaft 121 to a driven sprocket 186, which is secured to a driving shaft 185 of an oil pump 184 disposed on the rear side of the intermediate shaft 121 below the main shaft 123, through a transmission chain 187 to drive the oil pump 184.

Further, the intermediate side driving gear wheel 182 meshes with a driven gear wheel (hereinafter referred to as main side driven gear wheel) 191 provided for relative rotation on the main shaft 123 to transmit rotation of the intermediate shaft 121 at a reduced speed to the main shaft 123 through a clutch mechanism (not shown). In particular, the reduction gear ratio from the crankshaft 105 to the main shaft 123, that is, the primary reduction gear ratio of the engine 17, is set by the reduction gear ratio between the intermediate side driving gear wheel 182 and the main side driven gear wheel 191.

The main shaft 123 is supported for rotation upwardly of the rear side of the crankshaft 105, and the countershaft 125 is supported for rotation substantially rearwardly of the main shaft 123. A final drive gear group not shown is disposed over the main shaft 123 and the countershaft 125, and a transmission is configured from the members mentioned.

The countershaft 125 is connected at a left end portion thereof to a drive shaft (not shown) extending in the forward and rearward direction of the vehicle body. Consequently, rotation of the countershaft 125 is transmitted to the drive shaft.

Figure 5:
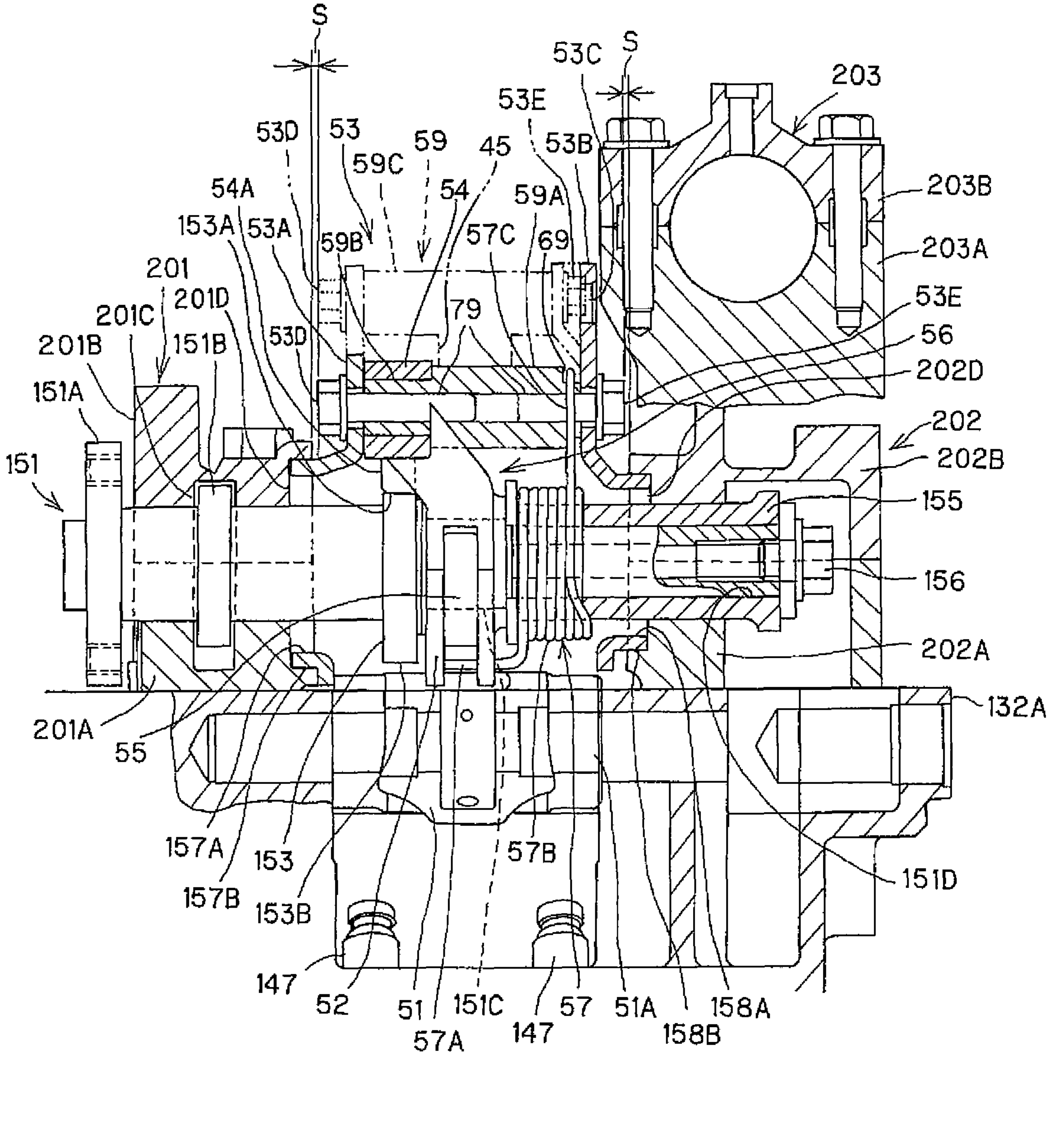
FIG. 5 is a vertical sectional view of the valve mechanism of the front bank as viewed from the rear side.

FIG. 4 is a side elevational view partly in section showing a representative one of the valve trains 50, and FIG. 5 is a vertical sectional view of the valve train 50 of the front bank 110A, as viewed from the rear side thereof.

As shown in FIG. 3, the valve trains 50 are provided substantially symmetrically with respect to the cylinder axial line C, and independently of each other on the intake side and the exhaust side. Further, since the valve trains 50 of the front bank 110A and the rear bank 110B have a substantially same structure, in the description of the present embodiment, only the valve train 50 on the intake side of the front bank 110A is described.

As shown in FIGS. 4 and 5, the valve train 50 includes the camshaft 151 (on the exhaust side, the camshaft 152), including the intake and exhaust cams 153, 154 which rotate integrally with the camshaft 151, and rocker arms 51, 52 for respectively opening and closing the intake and exhaust valves 147, 148. The valve train 50 also includes a valve cam 52 supported for relative rotation on the camshaft 151 for opening and closing the intake valve 147 through the rocker arm 51, a holder member 53 rockable around the camshaft 151, and a link mechanism 56 supported for rocking motion on the holder member 53 and provided to transmit valve driving force of the intake cam 153 to the valve cam 52 to rock the valve cam 52. The valve train 50 further includes a driving mechanism 60 for rotating the holder member 53. Further, the link mechanism 56 includes a sub rocker arm 54 connected to the holder member 53, and a connect link 55 for connecting the sub rocker arm 54 and the valve cam 52 for rocking motion.

The rocker arm 51 is formed wide, and the intake valves 147 in pair are opened and closed by the single rocker arm 51. The rocker arm 51 is supported at an end portion thereof for rocking motion on a rocker arm pivot 51A secured to the cylinder head 132A. An adjusting portion 51B of the screw type for abutting with an upper end portion of the intake valve 147 is provided at the other end portion of the rocker arm 51, and a roller 51C, for contacting the valve cam 52, is supported for rotation at a middle portion of the rocker arm 51.

As shown in FIG. 5, the camshaft 151 has a sprocket-securing portion 151A formed thereon and having the driven sprocket 161 (FIG. 2) secured to one end side thereof. Further, a positioning flange 151B projecting to the outer periphery of the camshaft 151 and having a circular sectional shape, the intake cam 153, a valve cam supporting portion 151C for rotating the valve cam 52 for rocking motion, and a collar fitting portion 151D, formed with a smaller diameter than the valve cam supporting portion 151C, are provided on the camshaft 151, arranged in the order listed, from the sprocket securing portion 151A side. A camshaft collar 155, which functions as a bearing for the camshaft 151, is journaled outside of the collar fitting portion 151D, and is held in place, and pressed against the valve cam 52 side, by a fixing bolt 156 fastened to the other end of the camshaft 151.

The camshaft 151 is supported at the opposite ends thereof for rotation by camshaft supporting portions 201 and 202. Particularly, the camshaft supporting portions 201 and 202 are configured such that caps 201B and 202B each having a supporting portion of a substantially semicircular shape are secured to head side supporting portions 201A and 202A of a semicircular sectional shape formed at an upper portion of the cylinder head 132A, respectively. On the camshaft supporting portion 201 provided on the positioning flange 151B side, a groove 201C is formed in conformity with the shape of the positioning flange 151B such that the position of the positioning flange 151B is controlled by the groove 201C thereby to position the camshaft 151 in the axial direction.

Further, holder supporting portions 201D and 202D for supporting the holder member 53 are provided on the face of the camshaft supporting portions 201 and 202 on the intake cam 153 side, respectively.

The valve cam 52 is supported for rotation on the valve cam supporting portion 151C provided at an intermediate portion of the camshaft 151. On the valve cam 52, a base portion 52A and a cam lobe portion 52B are formed, as shown in FIG. 4. The base portion 52A of the valve cam 52 is provided for selectively keeping the intake valve 147 in a closed state, and the cam lobe portion 52B is provided for selectively pushing down the intake valve 147 to open the valve. A through-hole 52C is formed in the cam lobe portion 52B, as shown.

A valve cam return spring 57 (FIG. 5), is disposed surrounding a portion of the camshaft collar 55, as shown, and this spring is provided for biasing the valve cam 52 in a direction in which the cam lobe portion 52B is spaced away from the roller 51C of the rocker arm 51, that is, in a direction in which the intake valve 147 is closed. One end 57A of the valve cam return spring 57 is attached to the through-hole 52C formed in the cam lobe portion 52B of the valve cam 52.

As seen in FIG. 5, the valve cam return spring 57 is a torsion coil spring, and is wrapped at a coiled portion 57B thereof around the camshaft 151. The valve cam return spring 57 is attached at the other end 57C thereof to the grooved portion 69 formed at an end portion of the holder member 53. The coiled portion 57B is formed long in the axial direction beyond the grooved portion 69 and is wrapped at the other end 57C thereof around the one end 57A side in such a manner as to overlap with the coiled portion 57B. Therefore, the valve cam return spring 57 can be disposed compactly in the axial direction while the number of turns thereof is assured.

The holder member 53 includes first and second plates 53A and 53B disposed in a predetermined spaced relationship from each other in the axial direction of the camshaft 151 sandwiching the intake cam 153 and the valve cam 52 therebetween, and a sub rocker arm holder 59 for connecting the first and second plates 53A and 53B to each other in the axial direction of the camshaft 151. The first plate 53A is disposed on one end side of the camshaft 151 to which the driven sprocket 161 is secured, and the second plate 53B is disposed on the other end side of the camshaft 151.

Further, the sub rocker arm holder 59 is configured to include shaft portions 59A and 59C extending in parallel to the camshaft 151 and a coupling portion 45 for coupling the shaft portion 59A and the shaft portion 59C integrally to each other. Further, a cylindrical accommodating portion 74 is formed at the coupling portion 45, and a sub rocker arm return spring 58 (hereinafter referred to as return spring) for biasing the sub rocker arm 54 to the intake cam 153 side is accommodated in the cylindrical accommodating portion 74.

At an end of the shaft portion 59A on the first plate 53A side, a sub rocker arm supporting portion 59B (fulcrum) to which one end of the sub rocker arm 54 is connected is formed. The sub rocker arm supporting portion 59B is a shaft formed with a smaller diameter than that of the shaft portion 59A.

The first and second plates 53A and 53B and the sub rocker arm holder 59 are secured by a pair of bolts 53D for fastening the first plate 53A and the sub rocker arm holder 59 from the outer face side of the first plate 53A and another pair of bolts 53E for fastening the second plate 53B and the sub rocker arm holder 59 from the outer face side of the second plate 53B. Female thread portions 79 into which the bolts 53D and 53E are screwed are formed individually on the shaft portions 59A and 59C.

Further, a bolt hole 53C is formed in the second plate 53B. The bolt hole 53C is operatively connected to the driving mechanism 60.

The first and second plates 53A and 53B have respective shaft holes 157A and 158A formed therein through which the camshaft 151 extends. The circumferential edge portions of the shaft holes 157A and 158A form ring-shaped annular projections 157B and 158B which project toward the holder supporting portions 201D and 202D of the camshaft supporting portions 201 and 202, respectively, as shown in FIG. 5. The holder member 53 is supported by the annular projections 157B and 158B fitted in the holder supporting portions 201D and 202D, respectively, and can be pivoted around the camshaft 151. Further, the annular projections 157B and 158B are assembled coaxially to the camshaft 151.

Further, a gap S is formed in the axial direction between an end of the cap 201B and the bolt 53D, and also between the cap 202B and the bolt 53E. The gaps S are set to a size with which, when the caps 201B and 202B are assembled from above to the head side supporting portions 201A and 202A, the caps 201B and 202B do not contact with the bolts 53D and 53E, respectively. Therefore, upon assembly operation, the bolts 53D and 53E do not make an obstacle and the assembly feasibility is good.

The sub rocker arm 54 is disposed together with the intake cam 153 and the valve cam 52 between the first and second plates 53A and 53B. The sub rocker arm 54 is supported at one end portion thereof on the sub rocker arm supporting portion 59B of the sub rocker arm holder 59 such that it is rocked around the sub rocker arm supporting portion 59B. A roller 54A for contacting with the intake cam 153 to press the base portion 153A and the cam lobe portion 153B is supported for rotation at a central portion of the sub rocker arm 54. The connect link 55 is connected at one end thereof to the other end portion of the sub rocker arm 54 through a pin 55A which supports the connect link 55 for rocking motion, and the valve cam 52 is connected to the other end of the connect link 55 through a pin 55B which supports the valve cam 52 for rocking motion.

Further, the sub rocker arm 54 is biased by the return spring 58, and the roller 54A of the sub rocker arm 54 is normally kept pressed against the intake cam 153.

The sub rocker arm 54 has a holder connecting portion 54B connected to the sub rocker arm supporting portion 59B and extends perpendicularly to the camshaft 151, an eccentric portion 54C extending from the holder connecting portion 54B and curved downwardly so as to extend along the outer diameter of the camshaft 151, and a link portion 54D connected to the valve cam 52 through the connect link 55.

The eccentric portion 54C is formed eccentrically in the axial direction of the camshaft 151 so as to bypass the intake cam 153 from the first plate 53A side to the second plate 53B, and a stepped portion 76 in the form of a plate is formed on a side face of the eccentric portion 54C such that it is swollen in the axial direction of the camshaft 151. The stepped portion 76 is provided so as to be curved along a lower edge portion of the sub rocker arm 54. The return spring 58 is received at a lower end thereof by the stepped portion 76 through a spring washer 77 (FIG. 4). The return spring 58 is received at an upper end thereof by a circlip 78 which engages with the accommodating portion 74.

The link portion 54D is provided continuously to an end of the eccentric portion 54C and is connected to the valve cam 52 through the connect link 55. Since the eccentric portion 54C is eccentric in this manner, the sub rocker arm 54 connects the intake cam 153 and the valve cam 52, which are provided at different positions in the axial direction on the camshaft 151, to each other.

Now, operation of the valve train 50 is described.

Referring to FIG. 4, if the camshaft 151 in the valve train 50 configured in such a manner as described above is rotated in the counterclockwise direction (FIG. 4), then the sub rocker arm 54 is pushed up by the cam lobe portion 153B of the intake cam 153, which rotates integrally with the camshaft 151, through the roller 54A and rocked around the shaft portion 59A. Together with this, the valve cam 52 is rotated in the clockwise direction in FIG. 4 around the camshaft 151 through the connect link 55. Then, by the rotation of the valve cam 52, the cam lobe portion 52B pushes the rocker arm 51 through the roller 51C to push down the intake valve 147 through the rocker arm 51 to open the intake valve 147.

Further, in a state wherein the base portion 153A of the intake cam 153 contacts with the roller 54A by further rotation of the camshaft 151, the sub rocker arm 54 is pushed down by the return spring 58 and the valve cam 52 is rotated in the counterclockwise direction in FIG. 4 by the valve cam return spring 57 until the base portion 52A is brought into contact with the roller 51C. Consequently, the intake valve 147 is pushed up into a closed state by the valve spring 149 (FIG. 2).

As shown in FIG. 4, a driving mechanism-connecting member 63 is connected to the holder member 53 in the valve train 50. Further, the driving mechanism-connecting member 63 is connected to the driving mechanism 60 (FIG. 6), and the holder member 53 is rocked in the direction indicated by an arrow mark A and the direction indicated by another arrow mark B by driving of the driving mechanism 60.

If the holder member 53 is rocked in the direction indicated by the arrow mark A, then the position of the sub rocker arm supporting portion 59B varies together with the holder member 53, and the link mechanism 56 is rocked in the clockwise direction around the axis of the camshaft 151 while the roller 54A is rocked in the clockwise direction and the valve cam 52 is rocked in the clockwise direction.

On the other hand, if the holder member 53 is rocked in the direction indicated by the arrow mark B, then the link mechanism 56 is rocked in the counterclockwise direction around the axis of the camshaft 151 together with the holder member 53, and the roller 54A is pivoted in the counterclockwise direction while the valve cam 52 is rocked in the counterclockwise direction.

In this manner, the valve train 50 is configured such that valve operation characteristics of the intake valve 147 and the exhaust valve 148, that is, the opening and closing timings, the opening and closing periods and the lift amount of the intake valve 147 and the exhaust valve 148, can be controlled by varying the position of the roller 54A and the initial position of the rocking movement of the valve cam 52.

Here, the initial position of the rocking motion of the valve cam 52 indicates a rocking position of the valve cam 52 in a state wherein the roller 54A contacts with the base portion 153A of the intake cam 153 and the sub rocker arm 54 is not pushed up by the cam lobe portion 153B. On the other hand, the opening and closing timings of the intake valve 147 and the exhaust valve 148 indicate the timings of opening and closing movements of the intake valve 147 and the exhaust valve 148 with respect to rotation of the camshafts 151 and 152, that is, the phases of the opening and closing movements of the intake valve 147 and the exhaust valve 148.

For example, if the holder member 53 on the intake side is rocked further in the direction of the arrow mark A (in the clockwise direction in FIG. 4), then the roller 54A and the valve cam 52 are rotated in the clockwise direction, and the cam lobe portion 52B comes close to the roller 51C. If the camshaft 151 is rotated in this state, then the starting timing of the pushing up of the roller 54A by the cam lobe portion 153B becomes earlier and the period within which the cam lobe portion 52B pushes down the roller 51C and the pushing down amount increase. Consequently, the opening timing of the intake valve 147 is hastened and the opening period and the lift amount of the intake valve 147 increase.

Figure 6:
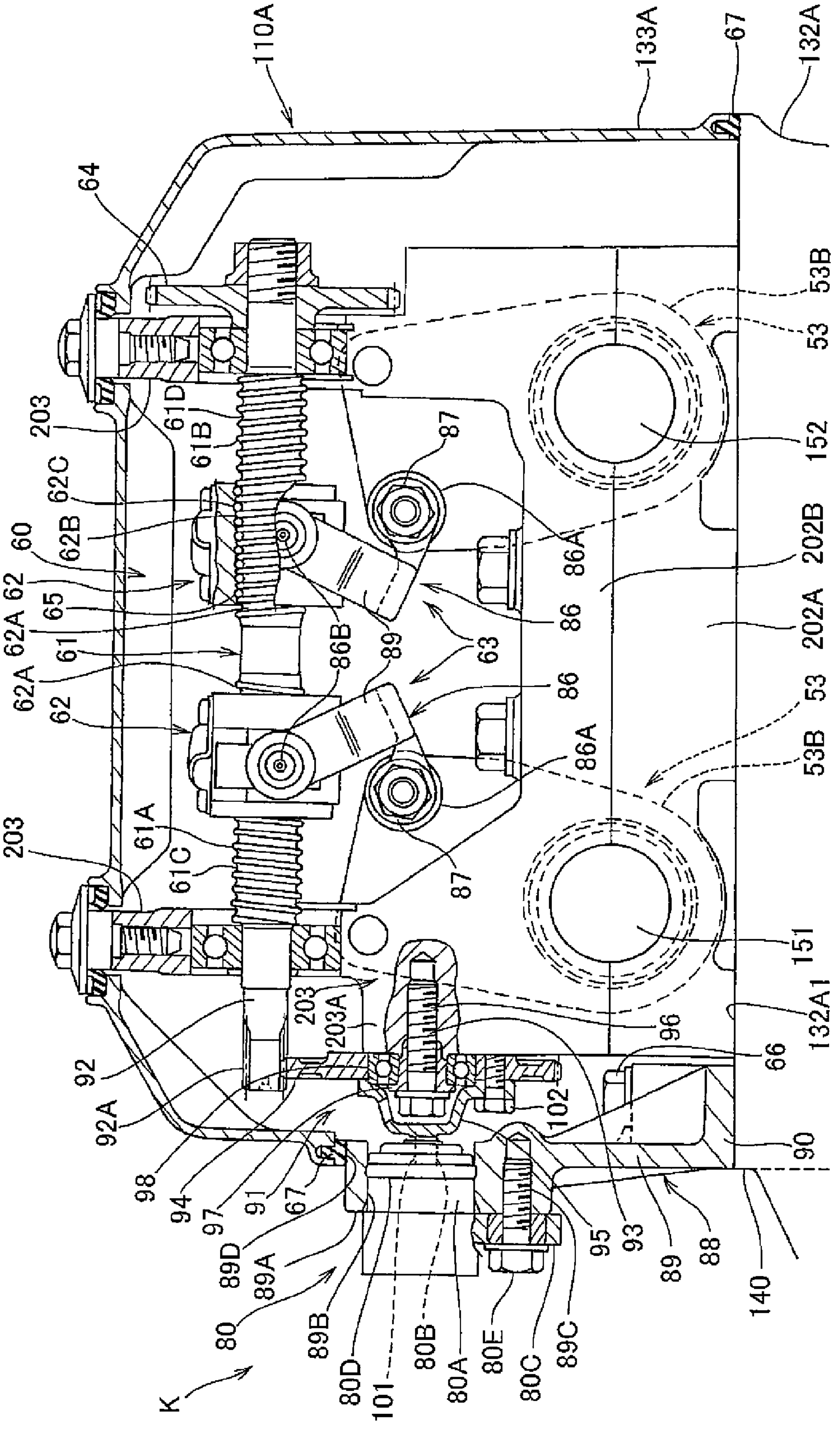
FIG. 6 is a vertical sectional view of a driving mechanism as viewed from the side face side.
Figure 7:
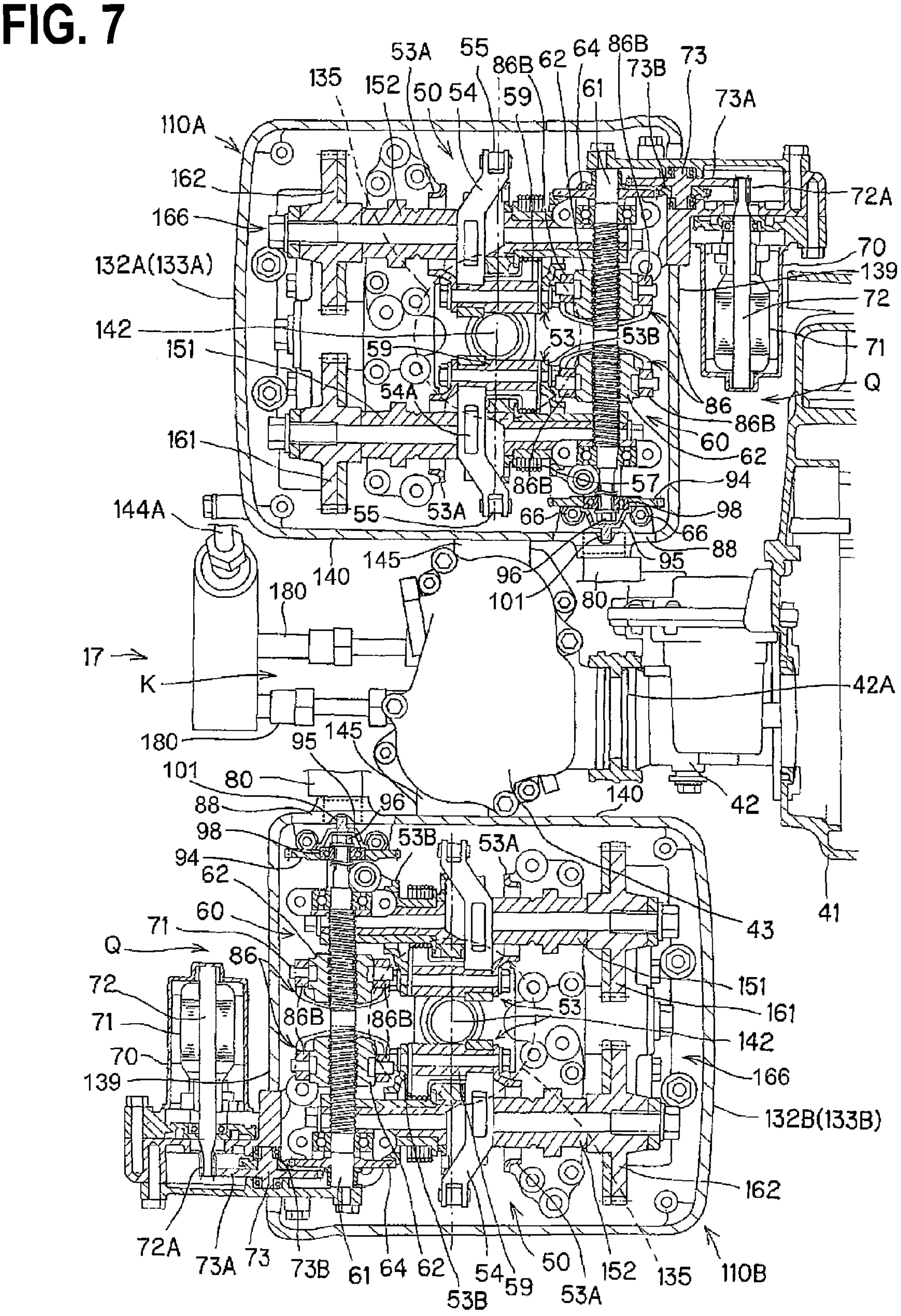
FIG. 7 is a horizontal sectional view of the engine as viewed from above.

FIG. 6 is a vertical sectional view of the driving mechanism 60 as viewed from the side. FIG. 7 is a horizontal sectional view of the engine 17 as viewed from above. It may be noted that, in FIG. 7, the banks 110A and 110B are shown in a view as viewed along the cylinder axial line C (FIG. 2) from above the engine 17. Further, as shown in FIG. 7, the rear bank 110B is disposed at a rear portion of the crankcase 110C with the front bank 110A rotated by 180° around the cylinder bore 135, and here, detailed description of the rear bank 110B is omitted.

As shown in FIG. 6, the driving mechanism 60 is connected to the holder member 53 through the driving mechanism-connecting member 63. The driving mechanism 60 has a bar-shaped ball screw 61 (rotational angle detection object shaft, rotary shaft) disposed over the camshaft 151 and the camshaft 152, two sliders 62 provided on the intake side and the exhaust of the ball screw 61 and threadably movable in the axial direction, an electric actuator 70 (FIG. 7) for rotating the ball screw 61, and the driving mechanism-connecting member 63. The driving mechanism-connecting member 63 is provided between each of the sliders 62 and each of the holder members 53.

A gear 64 is securely mounted at a front end portion of the ball screw 61 on the camshaft 152 side, and the electric actuator 70 is connected to the gear 64 through a gear train provided so as to extend inwardly and outwardly across an upper portion side wall of the cylinder head 132A. The electric actuator 70 is controlled by an electronic control unit (ECU) of the vehicle. As the ECU drives the electric actuator 70, the holder member 53 is rocked through the ball screw 61 and the driving mechanism-connecting member 63, and the operation characteristics of the intake valve 147 and the exhaust valve 148 are controlled in response to an operation state of the engine 17.

The electric actuator 70 includes an electric motor 71, a driving shaft 72 of the electric motor 71, and an intermediate shaft 73 to which driving force of the electric motor 71 is transmitted from the driving shaft 72. The electric motor 71 is secured to an outer side face 139 in the vehicle widthwise direction of an upper portion of the cylinder head 132A such that the driving shaft 72 thereof extends substantially in parallel to the ball screw 61. The electric actuator 70 is disposed at a front portion of the outer side face 139, and the air cleaner housing 41 extends in the vehicle forward and rearward direction in such a manner as to continue to a rear portion of the electric actuator 70.

A driving gear wheel portion 72A is formed on the driving shaft 72, and a first intermediate gear 73A which meshes with the driving gear wheel portion 72A and a second intermediate gear 73B which meshes with the gear 64 provided on the ball screw 61 are secured to the intermediate shaft 73.

As shown in FIG. 7, the engine 17 is configured such that the front bank 110A and the rear bank 110B are offset to the cam chain chambers 166 side with respect to the cylinder bores 135. In particular, the front bank 110A and the rear bank 110B are configured such that, where the cylinder bores 135 are regarded as the center, side walls thereof on the cam chain chambers 166 side are swollen in the vehicle widthwise direction from the outer side faces 139 of the cam chain chambers 166 on which the electric actuators 70 are disposed.

According to the present illustrative embodiment, since the electric actuators 70 are disposed on the counter offset sides Q of the front bank 110A and the rear bank 110B, the size in the vehicle widthwise direction of the front bank 110A and the rear bank 110B including the electric actuators 70 can be prevented from increasing one-sidedly to one side in the vehicle widthwise direction, and the electric actuators 70 can be disposed compactly.

Further, since the electric actuators 70 are provided on the outer side of the cylinder heads 132A and 132B and a space can be assured in the cylinder heads 132A and 132B, the ball screw 61, slider 62 and so forth can be disposed efficiently in the cylinder heads 132A and 132B.

Each ball screw 61 extends perpendicularly to the camshafts 151 and 152 and is disposed on the other end side of the camshafts 151 and 152, that is, on the side opposite to the side on which the driven sprockets 161 and 162 are secured. Since the ball screw 61 does not extend in the upward and downward direction of the engine 17 but is disposed so as to lie over the camshaft 151 and the camshaft 152, the height of the engine 17 can be suppressed low.

The ball screw 61 is supported at the opposite ends thereof for rotation by ball screw supporting portions 203. As shown in FIG. 5, the ball screw supporting portions 203 are each configured by securing a cap 203B having a supporting portion of a semi-circular sectional shape to a camshaft side supporting portion 203A formed at an upper portion of the camshaft supporting portion 202.

As shown in FIG. 6, helical screw threads 61A and 61B and helical shaft thread grooves 61C and 61D are formed on the intake side and the exhaust side on an outer circumferential face of the ball screw 61. The screw threads 61A and 61B and the shaft thread grooves 61C and 61D are set such that the screw winding directions on the intake side and the exhaust side are opposite to each other.

The slider 62 is formed as a block and has a through-hole 62A through which the ball screw 61 extends. A helical nut screw thread 62B corresponding to the screw thread 61A or 61B and a helical nut thread groove 62C corresponding to the shaft thread groove 61C or 61D are formed on an inner circumferential face of the through-hole 62A. A plurality of balls 65 are disposed for rolling movement between the nut thread groove 62C and the shaft thread groove 61C or 61D. When the ball screw 61 is rotated, the slider 62 moves in the axial direction on the ball screw 61 through the balls 65.

The driving mechanism-connecting member 63 has an arm member 86 connected to the slider 62, and a connecting member 87 for connecting the arm member 86 to the second plate 53B of the holder member 53. The connecting member 87 is configured from a bolt and a nut for connecting the second plate 53B and the arm member 86 to each other. The arm member 86 is formed in a substantially L shape as viewed in side elevation, and is secured at one end 86A thereof to the second plate 53B through the connecting member 87 and at the other end 86B for rocking motion to the slider 62. More particularly, the other end 86B of the arm member 86 extends to the opposite side faces of the slider 62 and is connected in such a manner as to sandwich the slider 62 from the opposite side faces.

If the arm member 86 is moved in the axial direction of the ball screw 61 integrally with the slider 62, then it is rocked around the other end 86B thereof while it pulls the holder member 53 to rock the holder member 53 connected to the one end 86A thereof.

Meanwhile, the slider 62 and the arm member 86 have same parts which are disposed symmetrically to each other with respect to a middle portion in the axial direction of the ball screw 61 on the camshaft 151 and the camshaft 152. If the ball screw 61 is rotated, then the sliders 62 move in the opposite directions to each other to rock the holder members 53 on the intake side and the exhaust side.

As shown in FIG. 6, a rotation angle sensor 80 (hereinafter referred to as a sensor 80) is provided on a wall portion of the cylinder head 132A in the proximity of an end of the ball screw 61 on the camshaft 151 side, for detecting the angle of rotation which is the amount of rotation of the ball screw 61. The ball screw 61 is a rotation angle detection object shaft whose angle of rotation is detected by the sensor 80. The ECU described hereinabove calculates the rocking amount of the holder members 53, based on the angle of rotation of the ball screw 61 detected by the sensor 80, and utilizes the calculated value for control of the valve operation characteristics.

The sensor 80 is supported by a sensor-supporting wall 88 provided on the cylinder head 132A.

Figure 8:
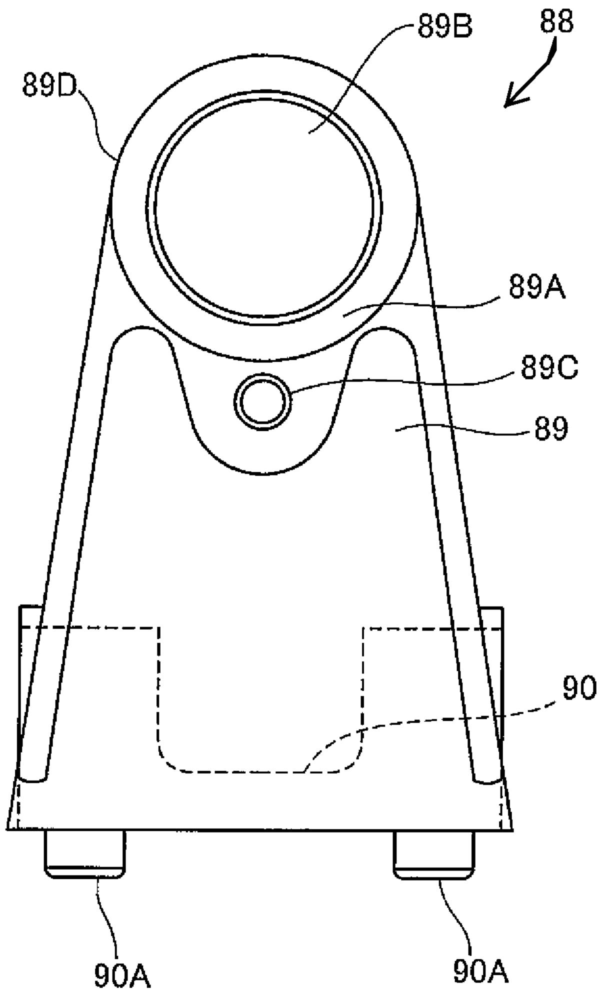
FIG. 8 is a front elevational view of a sensor-supporting wall.

FIG. 8 is a front elevational view of the sensor-supporting wall 88.

As shown in FIGS. 6, 7 and 8, the sensor-supporting wall 88 is a plate formed so as to have a substantially L shape as viewed in side elevation, and has a wall portion 89 extending in the upward and downward direction of the cylinder head 132A, and a base portion 90 provided at a lower end of the wall portion 89 and secured to an upper face 132A1 of the side wall of the cylinder head 132A.

A thick portion 89A is provided at an upper portion of the wall portion 89 such that it projects to the V bank space K side, and a sensor supporting hole 89B for supporting the sensor 80 is formed in the thick portion 89A. The sensor supporting hole 89B is a circular opening penetrating through the thick portion 89A. Meanwhile, a female thread portion 89C is formed in the thick portion 89A below the sensor supporting hole 89B. An outer edge portion 89D of the wall portion 89 is configured from left and right side edge portions formed so as to taper upwardly and an upper edge portion in the form of a curved face continuing to upper portions of the opposite side edge portions. The outer edge portion 89D serves as a catch pan for a gasket 67 for sealing between the head cover 133A and an upper face 132A1 of the cylinder head 132A.

A pair of positioning pins 90A for being fitted with hole portions (not shown) formed on the upper face 132A1 side are provided on the base portion 90, and the sensor-supporting wall 88 is secured integrally to an upper portion of the cylinder head 132A by a pair of bolts 66 extending through the positioning pins 90A and fastened to the upper face 132A1.

The sensor-supporting wall 88 is provided continuously to inner side walls 140 (cylinder head side walls) of the cylinder heads 132A and 132B which define the V bank space K, and forms a part of the side walls of upper portions of the cylinder heads 132A and 132B. The inner side wall 140 is a side wall of the cylinder head 132A extending perpendicularly to the ball screw 61. Further, the sensor-supporting wall 88 is disposed at an end of the inner side wall 140 on the electric actuator 70 side and is positioned on an extension line in the axial direction of the ball screw 61.

As shown in FIG. 6, the sensor 80 has a cylindrical body portion 80A, an inputting portion 80B provided on one end side of the body portion 80A for receiving rotation of an inspection object inputted thereto, and a stay portion 80C projecting from the body portion 80A on the other end side. The inputting portion 80B is connected to the detection object and rotated integrally with the detection object, and the angle of rotation of the detection object is obtained by detecting the angle of rotation thereupon.

The inputting portion 80B of the sensor 80 is provided on the axis of the body portion 80A and rotates around the axis. Here, the sensor 80 is a potentiometer. More particularly, the sensor 80 is a potentiometer having a detectable angular range not of a plurality of rotations but of an angle within one rotation) (360°), and can be acquired at a low cost because it is comparatively simple in structure.

The sensor 80 is supported in the sensor supporting hole 89B of the sensor-supporting wall 88 and disposed in a state wherein the inputting portion 80B is directed to the inside of the cylinder head 132A. An O-ring 80D made of rubber is interposed between the body portion 80A and the sensor supporting hole 89B. Further, the sensor 80 is secured to the sensor-supporting wall 88 by a sensor fixing bolt 80E which extends through the stay portion 80C and is fastened to the female thread portion 89C.

The sensor 80 is supported on the sensor-supporting wall 88 and disposed with a rear portion thereof exposed to the inside of the V bank space K. As shown in FIG. 7, a connecting portion 42A between the intake chamber 43 and the throttle body 42 is provided in the V bank space K, and the sensor 80 is disposed in a space between the connecting portion 42A and the inner side wall 140 of the front bank 110A. Further, the sensor 80 of the rear bank 110B is disposed in a space between a fuel pipe 180, which connects the fuel pipe 144A and the injectors 143, and the inner side wall 140 of the rear bank 110B.

Since the sensors 80 are disposed between the inner side wall 140 and the connecting portion 42A and between the inner side wall 140 and the fuel pipe 180 in the V bank space K in this manner, the sensors 80 can be disposed compactly such that they may not make an obstacle to disposition of other parts such as the intake chamber 43, throttle body 42 and fuel pipe 180. Further, since the sensors 80 are covered from forwardly and rearwardly with the engine 17, they can be prevented from being hit by a flying stone and so forth.

Figure 9:
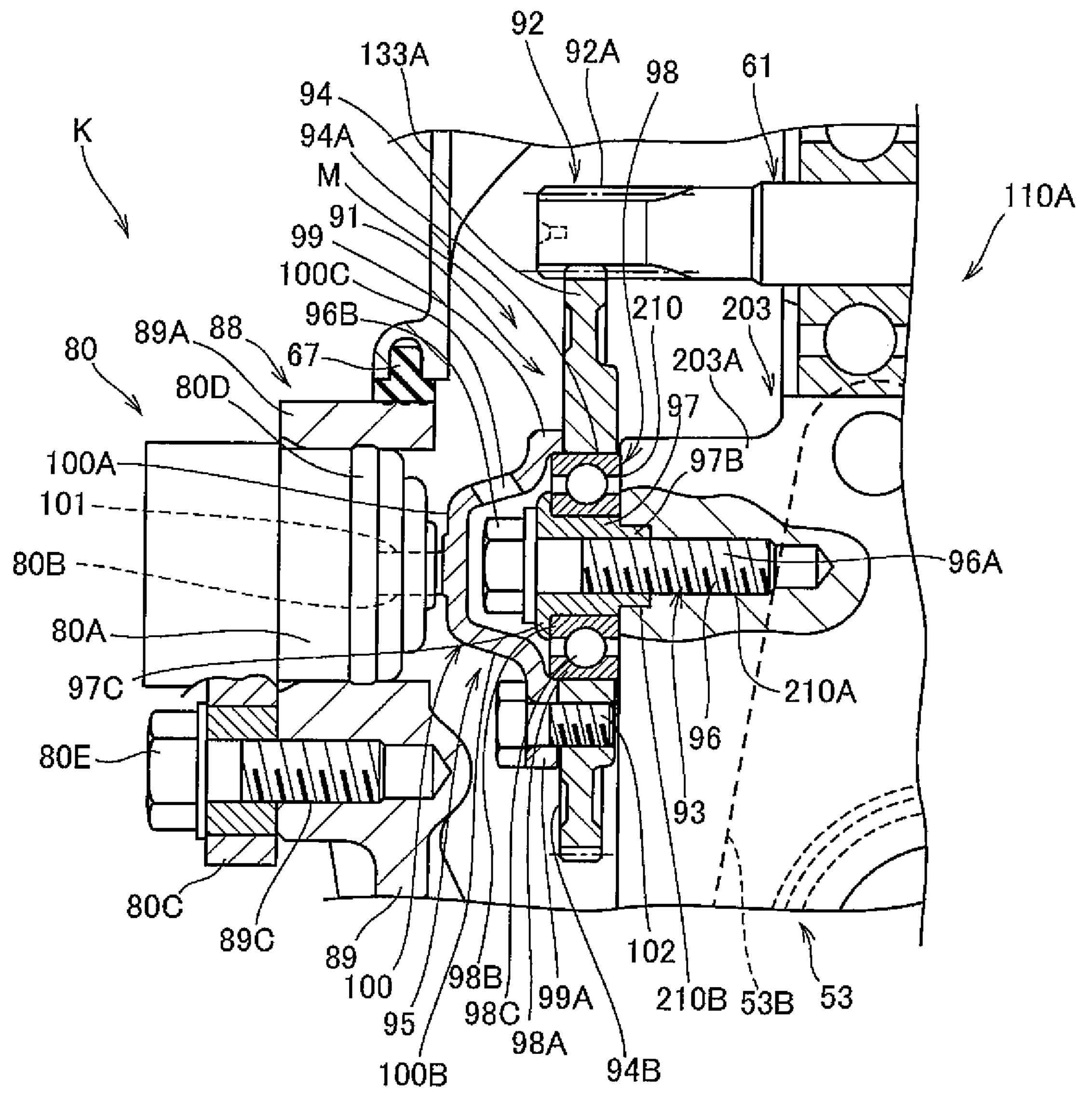
FIG. 9 is an enlarged view of peripheral members to a sensor in FIG. 6.

FIG. 9 is an enlarged view of peripheral elements of the sensor 80 shown in FIG. 6.

A rotation transmitting portion 91 is provided between the ball screw 61 and the sensor 80, and rotation of the ball screw 61 is transmitted to the sensor 80 by the rotation transmitting portion 91.

The rotation transmitting portion 91 has an output power shaft 92 formed at one end of the ball screw 61 on the opposite side to the gear 64, a gear supporting shaft 93 disposed in parallel to the output power shaft 92 below the output power shaft 92, a reduction gear 94 supported on the gear supporting shaft 93 and held in meshing engagement with the output power shaft 92, and a sensor attaching supporting portion 95 (also referred to as a sensor-connecting element) secured integrally to the reduction gear 94 and attached to the sensor 80.

The output power shaft 92 has a driving gear 92A which meshes with the reduction gear 94, and this driving gear 92A is formed by shaping an outer circumferential face of an end portion of the ball screw 61 so as to have a shape of a gear. The number of teeth of the reduction gear 94 is greater than that of the driving gear 92A so that the speed of rotation of the ball screw 61 is reduced by the reduction gear 94.

More particularly, the reduction gear ratio between the driving gear 92A and the reduction gear 94 is set corresponding to the maximum angle of rotation of the ball screw 61, that is, to the range of rocking motion of the holder member 53 and is set such that, also where the ball screw 61 rotates by a plural number of times and the holder member 53 is rocked fully over the range of rocking motion thereof, the angle of rotation of the reduction gear 94 is smaller than one rotation.

The gear supporting shaft 93 has a supporting bolt 96 screwed in the ball screw supporting portion 203, and a collar 97 fitted with the shaft portion 96A of the supporting bolt 96 and secured to the ball screw supporting portion 203. The supporting bolt 96 is a hexagon bolt having a shaft portion 96A and a hexagonal head portion 96B. The supporting bolt 96 is secured to a supporting wall 210 which is a wall portion of the ball screw supporting portion 203 on the side opposing to the sensor-supporting wall 88 and is provided in parallel to the ball screw 61 immediately below the ball screw 61.

A female thread portion 210A into which the supporting bolt 96 is screwed and a positioning hole 210B formed with a greater diameter than that of the female thread portion 210A and with high accuracy on the front face side of the supporting wall 210 are formed on the supporting wall 210. The supporting wall 210 is positioned on the inner side of the cylinder head 132A with respect to an end of the output power shaft 92 and is provided substantially in parallel to the sensor-supporting wall 88, and a space M in which the rotation transmitting portion 91 can be disposed is formed between the supporting wall 210 and the sensor-supporting wall 88.

Figure 10:
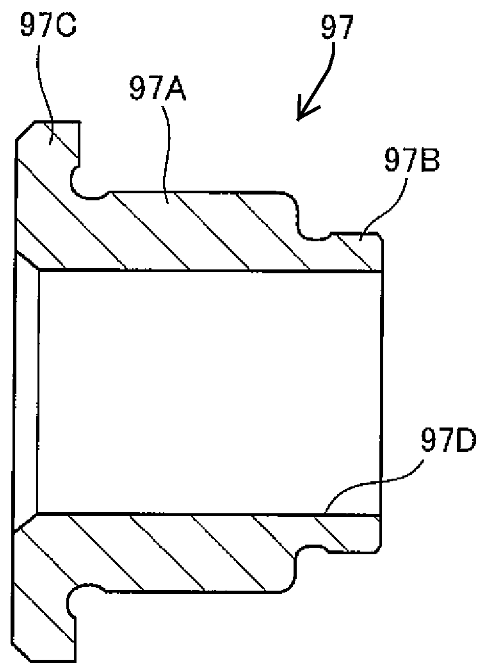
FIG. 10 is a sectional view of a collar.

FIG. 10 is a sectional view of the collar 97.

The collar 97 has a cylindrical collar shaft portion 97A, a positioning portion 97B formed with a smaller diameter than that of the collar shaft portion 97A and with high accuracy on one end side of the collar shaft portion 97A, a flange portion 97C formed with a greater diameter than that of the collar shaft portion 97A on the other end side of the collar shaft portion 97A, and an inner diameter portion 97D which fits with the shaft portion 96A of the supporting bolt 96.

The collar 97 is positioned to the supporting wall 210 by engaging the positioning portion 97B thereof with the positioning hole 210B, and is secured to the supporting wall 210 by the head portion 96B which contacts with an end face of the flange portion 97C by fastening force of the supporting bolt 96. The head portion 96B of the supporting bolt 96 is disposed in an opposing relationship to the inputting portion 80B of the sensor 80, and the axis of the supporting bolt 96 and the axis of the sensor 80 substantially coincide with each other.

The reduction gear 94 is supported on the collar 97 through a bearing 98 provided at a central portion thereof.

The bearing 98 is a ball bearing and is configured including an outer race 98A on the outer diameter side, an inner race 98B on the inner diameter side, and a plurality of balls 98C provided between the outer race 98A and the inner race 98B.

The reduction gear 94 is formed in a shape of a disk, and a force fitting hole 94A open in a circular shape is formed at a central portion of the reduction gear 94. The bearing 98 is provided integrally with the reduction gear 94 by the outer race 98A being force fitted in a force fitting hole 94A.

The bearing 98 is attached to the collar 97 with the inner race 98B thereof fitted with an outer circumferential face of the collar shaft portion 97A and is secured by being pressed against the supporting wall 210 by the flange portion 97C acted upon by the fastening force of the supporting bolt 96.

In this manner, the reduction gear 94 is supported in a cantilever fashion by the single supporting bolt 96 fastened to the supporting wall 210 below the ball screw 61. Therefore, a large space in the axial direction of the supporting bolt 96 is not required to provide the reduction gear 94, and the reduction gear 94 can be disposed compactly.

Further, since the collar 97 is secured by the fastening force of the supporting bolt 96 in the state wherein it is positioned and supported by the positioning portion 97B and the positioning hole 210B which are formed with high accuracy, even if it is supported in a cantilever fashion, the collar 97 and the bearing 98 can be secured with certainty and the reduction gear 94 can be supported with certainty.

Figure 11A:
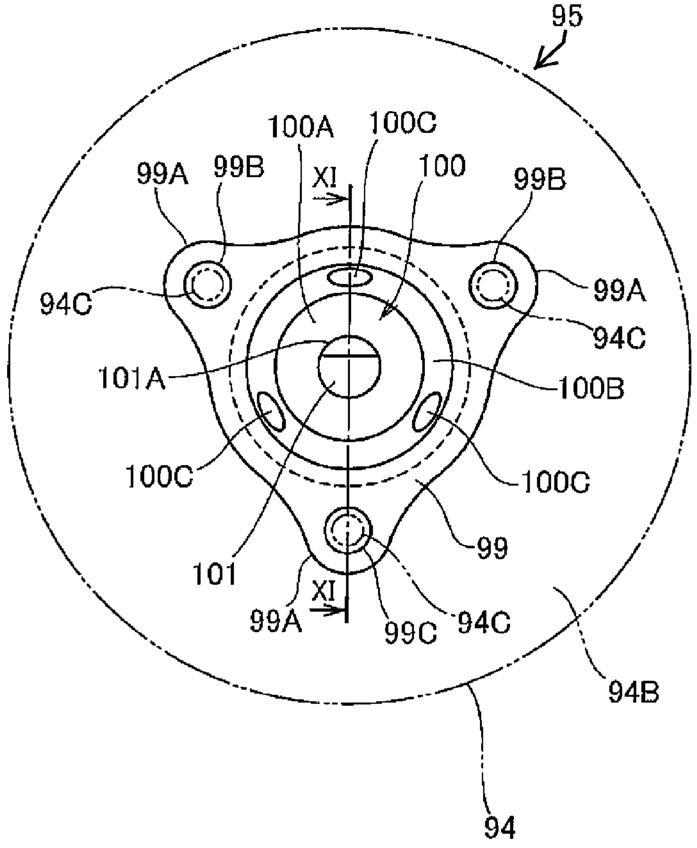
FIG. 11A is a plan view showing a sensor connecting member.
Figure 11B:
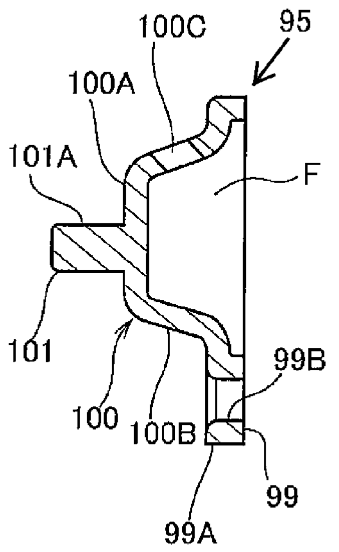
FIG. 11B is a sectional view taken along line XI-XI of FIG. 11A.

FIGS. 11A and 11B are views showing the sensor-connecting element 95. FIG. 11A is a plan view showing the sensor-connecting element 95. FIG. 11B is a sectional view taken along line XI-XI of FIG. 11A. It may be noted that, in FIG. 11A, the reduction gear 94 is indicated by an alternate long and two short dashes line together with the sensor-connecting element 95.

As shown in FIGS. 9, 11A and 11B, the sensor-connecting element 95 is formed such that a central portion of a plate member substantially in the form of a disk is swollen in a convex manner, and has a base portion 99 formed in an annular shape for contacting with the outer side face 94B of the reduction gear 94, and a swollen portion 100 swollen in a convex shape at a central portion thereof. An accommodating space F is formed on the inner side of the swollen portion 100.

Three attaching portions 99A are formed at different places of the base portion 99 by being partly projected in a diametrical direction, and each of the attaching portions 99A has a hole 99B formed therein so as to extend therethrough. The attaching portions 99A are disposed in a spaced relationship by a substantially equal distance from each other such that they divide an outer circumference of the base portion 99 equally into three portions.

The swollen portion 100 has a top portion 100A forming a disk-shaped end face of the swollen portion 100 and opposing to the head portion 96B, and a cylindrical outer wall portion 100B which interconnects an outer edge of the top portion 100A and the base portion 99. A plurality of communicating holes 100C are formed in the outer wall portion 100B such that they extend through the outer wall portion 100B and are communicated with the accommodating space F.

A sensor connecting stem 101 arranged perpendicular to the plane of the top portion 100A is provided uprightly at the top portion 100A of the sensor-connecting element 95. A key portion 101A is formed on the sensor connecting stem 101 by cutting away part of a circular cross section of the sensor connecting stem 101 in the axial direction.

As shown in FIG. 11A, threaded hole portions 94C are formed at positions of the reduction gear 94 which correspond to the holes 99B of the sensor-connecting element 95. The sensor-connecting element 95 is secured integrally to the reduction gear 94 by fixing bolts 102 fitted in the holes 99B from the swollen portion 100 side and fastened to the threaded hole portions 94C.

The sensor-connecting element 95 is secured to the outer side face 94B of the reduction gear 94 across the head portion 96B of the supporting bolt 96 in such a manner as to cover the head portion 96B, and the head portion 96B of the supporting bolt 96 and the flange portion 97C of the collar 97 are accommodated in the accommodating space F between the swollen portion 100 and the outer side face 94B.

The sensor-connecting element 95 is secured such that the axis of the sensor connecting stem 101 is in register with the axis of the supporting bolt 96, that is, with the center of rotation of the reduction gear 94. The sensor connecting stem 101 rotates at an equal speed to that of the reduction gear 94 integrally with the reduction gear 94.

The sensor connecting stem 101 of the sensor-connecting element 95 is inserted in the inputting portion 80B of the sensor 80 supported on the sensor-supporting wall 88 and is connected to the inputting portion 80B, and the inputting portion 80B rotates integrally with the sensor connecting stem 101. The inputting portion 80B is formed in a shape corresponding to the key portion 101A, and the sensor connecting stem 101 is connected with certainty to the inputting portion 80B by the key portion 101A.

Here, operation of the sensor 80 and the reduction gear 94 is described.

If the electric actuator 70 is driven in accordance with an instruction of the ECU to rotate the ball screw 61, then the output power shaft 92 rotates integrally with the ball screw 61, and the rotation of the output power shaft 92 is transmitted to the reduction gear 94. Here, the speed of the rotation of the output power shaft 92 is reduced by the reduction gear 94. Then, by the rotation of the reduction gear 94, the sensor-connecting element 95 is rotated integrally with the reduction gear 94, and the inputting portion 80B of the sensor 80 is rotated at an equal speed to that of the reduction gear 94 by the sensor connecting stem 101. Then, the ECU calculates the speed of rotation of the ball screw 61 based on the speed of rotation of the reduction gear 94 detected by the sensor 80.

In the present illustrative embodiment, the reduction gear 94 is supported in a cantilever fashion on one end side in the axial direction of the supporting bolt 96 and the sensor connecting stem 101 of the sensor-connecting element 95 provided on the other end side of the supporting bolt 96 is connected to the inputting portion 80B of the sensor 80. Consequently, a large space is not required for supporting of the reduction gear 94 and transmission of rotation of the reduction gear 94 to the sensor 80. Therefore, the attaching structure for the sensor 80 can be miniaturized in the axial direction of the ball screw 61 and the gear supporting shaft 93.

The attachment of the sensor 80 can be carried out by inserting the sensor 80 into the sensor supporting hole 89B of the sensor-supporting wall 88 to connect the inputting portion 80B to the sensor-connecting element 95 and then fastening the sensor fixing bolt 80E to the female thread portion 89C of the sensor-supporting wall 88. Therefore, maintenance of the sensor 80 can be carried out from the outer side of the cylinder head 132A, and the maintenance operability is good.

Further, the O-ring 80D is interposed between the body portion 80A and the sensor supporting hole 89B so that displacement from alignment between the sensor connecting stem 101 and the inputting portion 80B by assembly error or the like can be absorbed by deformation of the O ring 80D. Consequently, strain can be prevented from appearing between the sensor 80 and the sensor-connecting element 95 and the friction can be reduced.

As described above, according to the illustrative of the present invention, the outer race 98A of the bearing 98 is forced fitted in the reduction gear 94 and the inner race 98B of the bearing 98 is secured to the supporting wall 210 by means of the supporting bolt 96. Besides, the sensor-connecting element 95 is secured integrally with the outer side face 94B of the reduction gear 94 and the sensor-connecting element 95 is connected to the sensor 80. Consequently, only one bearing 98 is required for attachment of the reduction gear 94. Therefore, since a large space for attachment of the reduction gear 94 is not required, the attaching structure for the sensor 80 can be miniaturized in the axial direction of the ball screw 61.

Further, since only one bearing 98 is required to support the reduction gear 94, the number of parts can be reduced. Furthermore, since the sensor-connecting element 95 integrally secured to the reduction gear 94 is connected to the sensor 80, the attaching structure for the sensor 80 can be miniaturized in the axial direction.

Further, the angle of rotation of the ball screw 61 can be detected using the sensor 80 which is a less expensive potentiometer.

Further, since the electric actuator 70 is provided in parallel to the ball screw 61 on the outer side face 139 of the cylinder head 132A and the sensor 80 is provided on the inner side wall 140 extending perpendicularly to the ball screw 61, the electric actuator 70 and the sensor 80 do not make an obstacle to the disposition of other parts and can be disposed compactly.

Furthermore, since the electric actuator 70 is disposed on the counter offset side Q of the front bank 110A and the rear bank 110B, it can be disposed compactly, and the size in the vehicle widthwise direction of the engine 17 can be suppressed small.

Also, since the sensor 80 is disposed on the inner side of the V bank space K, it can be disposed compactly such that it does not make an obstacle to the disposition of other parts such as the intake chamber 43, throttle body 42 and fuel pipe 180.

Further, since the sensor 80 is disposed on the inner side of the V bank space K disposed in the forward and rearward direction of the motorcycle 10 and is surrounded by the engine 17, it can be prevented from being hit by a flying stone or the like.

It may be noted that the embodiment described above indicates a mode to which the present invention is applied. However, the present invention is not limited to the embodiment described above.

While, in the embodiment described above, the valve train 50 of the engine 17 varies the opening and closing phases and the lift amounts of the intake valve 147 and the exhaust valve 148, the present invention is not limited to this. The valve mechanism may be otherwise configured, such that only the opening and closing phases are varied, or only the lift amounts are varied. Also other detailed configurations can naturally be modified as needed.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In an internal combustion engine having a cylinder head, and a rotary shaft operatively mounted to the cylinder head, a rotation angle sensing assembly for sensing an angular position of said rotary shaft, said rotation angle sensing assembly comprising:

a reduction gear which is rotatably mounted to a supporting wall portion of the cylinder head and is operatively connected to the rotary shaft;

a cylindrical bearing member which is force-fitted into a central bore of the reduction gear and which has a central hole formed therein which receives a mounting bolt therethrough; and a rotation angle sensor operable to detect the angular position of said rotary shaft through movement of said reduction gear, said rotation angle sensor comprising a main sensor body and an attaching supporting portion affixed to the main sensor body, wherein the attaching supporting portion is affixed to the reduction gear.

2. The internal combustion engine and rotation angle sensing assembly of claim 1, wherein said bearing member comprises an outer race and an inner race, wherein the outer race is force-fitted in and secured to a central portion of said reduction gear, wherein the inner race of said bearing is secured to the supporting wall portion of the cylinder head by said mounting bolt, and wherein the attaching supporting portion of said rotation angle sensor extends across a head portion of said bolt, and is integrally attached to a side face of said reduction gear.

3. The internal combustion engine and rotation angle sensing assembly according to claim 1, wherein said rotation angle sensor comprises a potentiometer.

4. The internal combustion engine and rotation angle sensing assembly of claim 3, wherein said internal combustion engine is a V-type internal combustion engine having cylinders disposed in a V-shaped bank, and said actuator is disposed on the counter offset side of the front and rear cylinders.

5. The internal combustion engine and rotation angle sensing assembly according to claim 4, wherein said rotation angle sensor is disposed on the inner side of said V-shaped bank.

6. The internal combustion engine and rotation angle sensing assembly according to claim 4, wherein said internal combustion engine is V-type engine of a motorcycle; and wherein banks of the engine arranged in V shape are disposed in a longitudinal direction of a vehicle body.

7. The internal combustion engine and rotation angle sensing assembly of claim 3, wherein said internal combustion engine is a V-type engine having a V-shaped bank; and wherein said rotation angle sensor is disposed on the inner side of said V-shaped bank.

8. The internal combustion engine and rotation angle sensing assembly of claim 1, further comprising:

a valve mounted in said cylinder head; and a valve train for operating said valve;

wherein said rotary shaft is arranged parallel to an actuator provided on a side face of the cylinder head, and said rotary shaft is operable to be driven by the actuator to affect operation of said valve train in such a manner to vary a phase and/or a lift amount of the valve;

wherein a driving gear for rotatably driving said reduction gear is provided at an end portion of said rotary shaft, and said rotation angle sensor is provided on a side face of the cylinder head which extends substantially perpendicularly to said rotary shaft.

9. A V-type internal combustion engine comprising a cylinder head;

a supporting wall provided on the cylinder head;

a reduction gear;

a rotary shaft;

a rotation angle sensor operable to detect rotation of the rotary shaft through the reduction gear, said rotation angle sensor comprising an attaching supporting portion;

a bearing comprising an outer race force-fitted in and secured to a central portion of said reduction gear, and an inner race secured to the supporting wall by a mounting bolt;

wherein the attaching supporting portion extends across a head portion of said bolt, and is integrally secured to a side face of said reduction gear.

10. A V-type internal combustion engine according to claim 9, wherein said rotation angle sensor is a potentiometer.

11. A V-type internal combustion engine according to claim 10, further comprising a variable valve mechanism comprising a plurality of valves;

an actuator arranged on a side face of the cylinder; said actuator operable to drive said rotary shaft for varying phases/lifts of said plurality of valves;

wherein a driving gear of said reduction gear is provided at an end portion of said rotary shaft, and said rotation angle sensor is provided on a side face of said cylinder head which extends substantially perpendicularly to said rotary shaft.

12. A V-type internal combustion engine according to claim 10, wherein said rotation angle sensor is disposed on an inner side of a V shape bank of the engine.

13. A V-type internal combustion engine according to claim 9, further comprising a variable valve mechanism comprising a plurality of valves;

an actuator arranged on a side face of the cylinder; said actuator operable to drive rotary shaft for varying phases/lifts of said plurality of valves;

wherein a driving gear of said reduction gear is provided at an end portion of said rotary shaft, and said rotation angle sensor is provided on a side face of said cylinder head which extends perpendicularly to said rotary shaft.

14. A V-type internal combustion engine according to claim 13, wherein said actuator is disposed on a counter offset side of front and rear cylinders of the engine.

15. A V-type internal combustion engine according to claim 9, wherein said rotation angle sensor is disposed on an inner side of a V shape bank of the engine.

16. A vehicle comprising a V-type internal combustion engine comprising a cylinder head;

a supporting wall provided on the cylinder head;

a reduction gear;

a rotary shaft;

a rotation angle sensor operable to detect rotation of the rotary shaft through the reduction gear, said rotation angle sensor comprising an attaching supporting portion;

a bearing comprising an outer race force-fitted in and secured to a central portion of said reduction gear; and an inner race secured to the supporting wall by a bolt;

wherein the attaching supporting portion extending across a head portion of said bolt is secured integrally to a side face of said reduction gear.

17. A vehicle according to claim 16, wherein said rotation angle sensor is a potentiometer.

18. A vehicle according to claim 17, further comprising a variable valve mechanism a plurality of valves; and an actuator arranged on a side face of the cylinder; said actuator operable to drive rotary shaft for varying phases/lifts of said plurality of valves;

wherein a driving gear of said reduction gear is provided at an end portion of said rotary shaft, and said rotation angle sensor is provided on a side face of said cylinder head which extends perpendicularly to said rotary shaft.

19. A vehicle according to claim 18, wherein said actuator is disposed on a counter offset side of front and rear cylinders of the engine.

20. A vehicle according to claim 16, wherein said rotation angle sensor is disposed on an inner side of a V shape bank of the engine.

* * * * *